(12) United States Patent
Drake, II et al.

(10) Patent No.: US 11,190,517 B2
(45) Date of Patent: Nov. 30, 2021

(54) ACCESS CONTROL BASED ON COMBINED MULTI-SYSTEM AUTHENTICATION FACTORS

(71) Applicant: AT&T Intellectual Property I, L.P., Atlanta, GA (US)

(72) Inventors: Alton Drake, II, Atlantic Highlands, NJ (US); Brian M. Novack, St. Louis, MO (US); Peter Galanis, Bethel, CT (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 370 days.

(21) Appl. No.: 16/058,746

(22) Filed: Aug. 8, 2018

(65) Prior Publication Data

US 2020/0053088 A1 Feb. 13, 2020

(51) Int. Cl.
*H04L 29/06* (2006.01)
*G06F 21/31* (2013.01)
*G06F 21/62* (2013.01)

(52) U.S. Cl.
CPC ............ *H04L 63/102* (2013.01); *G06F 21/31* (2013.01); *G06F 21/6218* (2013.01);
(Continued)

(58) Field of Classification Search
CPC .............. H04L 2463/082; H04L 63/08; H04L 63/102; H04L 63/105; H04L 63/20; G06F 21/31; G06F 21/6218
See application file for complete search history.

(56) References Cited

U.S. PATENT DOCUMENTS 7,340,525 B1 3/2008 Bhatia et al.
7,426,642 B2 9/2008 Aupperle et al.
(Continued)

FOREIGN PATENT DOCUMENTS

WO 2017003379 1/2017

OTHER PUBLICATIONS

Li Yao • Ning Zhang; Quantifying authentication Levels of Assurance in grid environments; 2010 Sixth International Conference on Information Assurance and Security (pp. 298-303); (Year: 2010).*
(Continued)

*Primary Examiner* — Luu T Pham
*Assistant Examiner* — Chao Wang
(74) *Attorney, Agent, or Firm* — Hartman & Citrin LLC (57) ABSTRACT

An access gateway may control access of user devices to remote computer resource systems in a multi-resource computing environment. The access gateway may determine an assurance level associated with a user of the multi-resource environment, where the assurance level is based on multiple authentication factors included in multiple previous access requests. The access gateway may receive, from a user device, an additional access request to access an additional resource system in the multi-resource environment. Based on a comparison of the assurance level with a threshold authentication level for the additional resource system, the access gateway may allow or deny access to the additional resource system. In addition, based on the comparison, the access system may request additional authentication data from the user device.

18 Claims, 6 Drawing Sheets

(52) U.S. Cl.
CPC ............ *H04L 63/08* (2013.01); *H04L 63/105* (2013.01); *H04L 63/20* (2013.01); *H04L 2463/082* (2013.01)

(56) References Cited

U.S. PATENT DOCUMENTS

| | | | |
|---|---|---|---|
| 7,739,744 | B2 | 6/2010 | Burch et al. |
| 7,886,346 | B2 | 2/2011 | Sandhu et al. |
| 8,413,210 | B2 | 4/2013 | Kuzin et al. |
| 8,583,498 | B2 | 11/2013 | Fried et al. |
| 8,640,206 | B2 | 1/2014 | Betsch et al. |
| 8,707,409 | B2 | 4/2014 | Shah et al. |
| 8,806,599 | B2 | 8/2014 | Roy |
| 8,978,100 | B2 | 3/2015 | Counterman |
| 8,997,196 | B2 | 3/2015 | Kariv et al. |
| 9,178,880 | B1 | 11/2015 | Dotan et al. |
| 9,398,001 | B1 | 7/2016 | Tidd |
| 9,491,161 | B2 | 11/2016 | Suresh et al. |
| 9,503,438 | B2 | 11/2016 | Choyi et al. |
| 9,584,515 | B2 | 2/2017 | Hayton |
| 9,628,448 | B2 | 4/2017 | Hayton et al. |
| 9,680,812 | B1 * | 6/2017 | Emaminouri ......... H04L 63/105 |
| 9,729,514 | B2 | 8/2017 | Lemaster |
| 9,749,331 | B1 | 8/2017 | Koeten |
| 9,904,791 | B1 | 2/2018 | Thankappan |
| 2009/0199264 | A1 * | 8/2009 | Lang ...................... G06F 21/57 726/1 |
| 2014/0096177 | A1 * | 4/2014 | Smith ................... G06F 21/45 726/1 |
| 2015/0382195 | A1 | 12/2015 | Grim et al. |
| 2016/0359838 | A1 * | 12/2016 | Dasgupta ................ G06F 21/45 |
| 2017/0134411 | A1 | 5/2017 | Ye |
| 2017/0244730 | A1 | 8/2017 | Sancheti et al. |
| 2017/0324729 | A1 | 11/2017 | Hon et al. |
| 2018/0183789 | A1 * | 6/2018 | Tischart ............. H04L 63/0281 |
| 2020/0042723 | A1 * | 2/2020 | Krishnamoorthy ..... G06F 21/40 |

OTHER PUBLICATIONS

Abdelwahhab Satta • Sihem Mostefai; Smart pattern authentication system for cloud consumers; 2017 3rd International Conference of Cloud Computing Technologies and Applications (CloudTech) (pp. 1-8); (Year: 2017).*

Aleksandra Nenadic • Ning Zhang • Jay Chin • Carole Goble; Adding Multi-Level Authentication to Shibboleth; 2006 Second IEEE International Conference on e-Science and Grid Computing (e-Science'06) (p. 157); (Year: 2006).*

"Every Application", Duo, duo.com; 2017, 13 pages.

"Identity-as-a-Service (IDaaS) for Cloud and Mobile App Single Sign-on and Security", https://www.centrify.com/solutions/cloud/identity-as-a-service-idaas/, Mar. 31, 2018, 5 pages.

"Modernizing Web Access Management: The New Era of Secure Access", Ping Identity, 2016, 12 pages.

"Secure Single Sign-on Solution", https://www.onelogin.com/product/sso, Oct. 8, 2015.

Emig et al., "Identity as a Service—Towards a Service-Oriented Identify Management Architecture", Cooperation & Management, Universitat Karlsruhe, 2007, 8 pages.

* cited by examiner

ND ON COMBINED
ACCESS CONTROL BASED ON COMBINED MULTI-SYSTEM AUTHENTICATION FACTORS

TECHNICAL FIELD

This disclosure relates generally to the field of secure authentication, and more specifically relates to authenticating a user of multiple computing systems.

BACKGROUND

Computing resource systems in a multi-resource computing environment may provide one or more resources or services to authenticated users. For example, a computing resource system may provide a resource, such as a database or a software service, to a user computing device that has provided authentication. In some cases, the computing resource system may have computing capabilities that do not support contemporary or advanced authentication techniques. For example, the computing resource system may have insufficient computing capabilities (such as memory or processing power) to perform an authentication technique based on multi-factor authentication data. In some cases, a computing resource system may be a legacy computing system, such as an older computing system that provides a resource, but which may be incapable of performing an advanced or contemporary authentication technique.

SUMMARY

According to certain implementations, an access gateway may control access to computing resource systems in a multi-resource computing environment. The access gateway may receive authentication data including multiple authentication factors. Each of the authentication factors may be received from one of a group of computing devices that are associated with a particular user of the multi-resource environment. Each of the authentication factors may be associated with a resource system in the multi-computer environment. The access gateway may determine an intrinsic value of each of the authentication factors, and may also determine a cumulative assurance level of the authentication data based on a combination of the intrinsic values. Each of the intrinsic values may indicate a validity level of the associated authentication factor. The cumulative assurance level of the authentication data may indicate an authentication level of the combination of the multiple authentication factors. Based on the cumulative assurance level, the access gateway may allow the group of computing devices to access the associated resource systems in the multi-resource computing environment.

In the example implementation, the access gateway may receive a request from one of the computing devices to access an additional resource system that is associated with a threshold authentication level. The access gateway may compare the threshold assurance level to the cumulative assurance level, and determine whether the cumulative assurance level meets or exceeds the threshold. Responsive to determining that the cumulative assurance level meets or exceeds the threshold authentication level, the access gateway may allow the computing devices to access the additional resource system. Responsive to determining that the threshold assurance level exceeds the cumulative assurance level, the access gateway may request an additional authentication factor. In some cases, the access gateway may modify the cumulative assurance level based on the additional authentication factor, and compare the threshold to the modified assurance level.

These illustrative implementations are mentioned not to limit or define the disclosure, but to provide examples to aid understanding thereof. Additional implementations are discussed in the Detailed Description, and further description is provided there.

BRIEF DESCRIPTION OF THE DRAWINGS

Features, Implementations, and Advantages of the Present Disclosure are Better Understood when the Following Detailed Description is Read with Reference to the Accompanying Drawings, where.

DETAILED DESCRIPTION

Existing techniques for authenticating in a multi-resource computing environment may not provide contemporary authentication techniques, such as multi-factor authentication techniques. It may be advantageous to develop techniques for a user to access multiple computing resources that do not support contemporary authentication techniques. In addition, a user may request access to multiple computing resource systems from multiple devices (e.g., a workstation, a personal computer, a personal mobile device). It may also be advantageous to develop techniques for a user to access a resource system from multiple devices based on a single access request from one of the devices.

Certain implementations described herein provide for an access gateway that is capable of controlling access to multiple computing resource systems in a multi-resource computing environment. The access gateway may be capable of determining a cumulative assurance level associated with a particular user of the multi-resource environment. In some implementations, the access gateway may be capable of receiving, from a user computing device for the particular user, a request to access an additional resource system in the multi-resource environment. The access gateway may be capable of controlling access of the user computing device, such as by allowing or denying access to the requested additional resource system. In addition, the access gateway may be capable of requesting additional authentication data from the particular user, based on a comparison of the cumulative assurance level with a threshold authentication level for the additional resource system.

Figure 1:
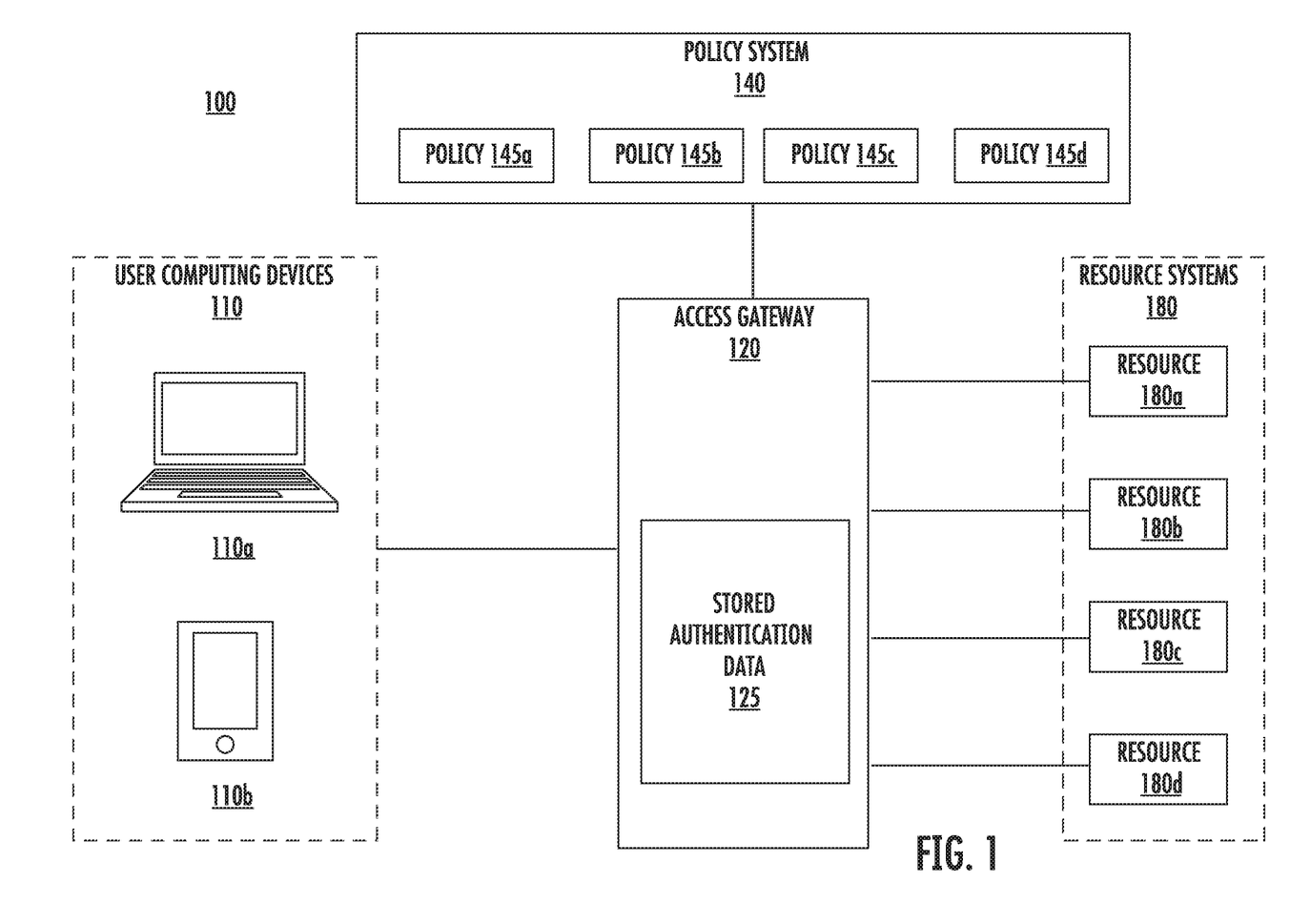
FIG. 1 is a block diagram depicting an example of a multi-resource computing environment, according to certain implementations.

Referring now to the drawings, FIG. 1 is a block diagram depicting an example of a multi-resource computing environment 100. The multi-resource environment 100 may include an access gateway 120, a policy system 140, and one or more computing resource systems, such as the computing resources 180*a*, 180*b*, 180*c*, and 180*d* (collectively referred to herein as resources 180 or resource systems 180). In some cases, the resources 180 include one or more legacy computing systems. In addition, the legacy computing system(s) may include insufficient computational ability (e.g., memory, processing speed) to receive or perform a contemporary security technique, such as analysis of multi-factor authentication data.

In some implementations, the multi-resource computing system 100 includes one or more computing devices, such as the user computing devices 110*a* or 110*b* (collectively referred to herein as user computing devices 110). The user computing devices 110 may be associated with a particular user of the multi-resource computing environment 100, such that the user accesses (or requests access to) one or more of the resources 180 via the one or more user computing devices 110.

In the multi-resource system 100, the access gateway 120 may receive multiple access requests from one or more of the user computing devices 110. Each of the access requests may indicate a request by the user to access a respective one of the resources 180. In addition, each of the access requests may include at least one authentication factor. Authentication factors may include (without limitation) a user login or password, a device identification (e.g., a serial number, an IP address), limited-use authentication data (e.g., a one-time passcode, a secure token), biometric data, or any other suitable authentication factor. In some cases, an access request includes multiple authentication factors, such as multi-factor authentication data. In addition, information included in multiple access requests may be combined to generate multi-factor authentication data. The access gateway 120 may store the authentication factors, such as in stored authentication data 125. In some cases, the stored authentication data 125 includes additional information associated with the authentication factors, such as a timestamp associated with an access request, an IP address (or other device identification) associated with the user computing device 110 that provided the access request, or any other suitable information.

In some implementations, the access gateway 120 may control access of the user computing devices 110 to the resources 180. For example, the access gateway 120 may provide (or deny) access of the user computing devices 110 to one or more of the resources 180, based on the stored authentication data 125. In some cases, the access gateway 120 may provide some or all of the stored authentication data 125 to the policy system 140. In addition, the policy system 140 may provide to the access gateway 120 information regarding a decision result based on the stored authentication data 125. The decision result may be further based on a policy included in the policy system 140. For example, each of the resources 180 may be associated with a policy that is included in the policy system 140. The resource 180*a* may be associated with a policy 145*a*. In addition, the resources 180*b*, 180*c*, and 180*d* may be associated respectively with the policies 145*b*, 145*c*, and 145*d*. In some implementations, a policy indicates a level of authentication that is required for access to the associated computing resource. For example, the policy 145*a* indicates a level of authentication that is required for access to the computing resource 180*a* to be granted. In some cases, a policy indicates a risk tolerance for the associated computing resource. For example, a computing resource that includes a database of sensitive or personal information may be associated with a policy indicating a relatively low tolerance for risk. In some cases, the level of authentication or the risk tolerance (or both) indicated by a particular policy may be based on one or more authentication factors. The authentication factors are received, for example, from a user that is requesting access to the computing resource associated with the particular policy. An authentication factor may include (or be associated with) an authentication strength, a time duration, a trust value, or any other suitable indication of the validity of the authentication factor.

In the multi-resource computing environment 100, access gateway 120 may receive a request from the user computing device 110*a* to access resource 180*a*. Based on the request, the access gateway 120 may determine some or all of the stored authentication data 125 that is associated with the user computing devices 110, such as multiple authentication factors that have previously been received from one or more of the user computing devices 110. The access gateway 120 may provide to the policy system 140 an indication of the access request for resource 180*a*. In addition, the access gateway 120 may provide to the policy system 140 some or all of the stored authentication data 125, data representing the stored authentication data 125 (such as an aggregated value), or any combination of these.

The policy system 140 may determine a level of authentication required to access the resource 180*a* based on the associated policy 145*a*. For example, the policy system 140 may determine whether the stored authentication data 125 (such as the multiple authentication factors associated with the user computing devices 110) meets the level of authentication indicated by the policy 145*a*. If the policy system 140 determines that the stored authentication data 125 meets or exceeds the level of authentication, the policy system 140 may provide to the access gateway 120 a first decision result indicating that the user computing devices 110 are authenticated for resource 180*a*. The access gateway 120 may allow the user computing devices 110 to access the resource 180*a* based on the first decision result.

If the policy system 140 determines that the stored authentication data 125 is less than the level of authentication, the policy system may provide to the access gateway 120 a second decision result indicating that the user computing devices 110 are not authenticated for resource 180*a*. In addition, the policy system 140 may provide to the access gateway 120 an indication that an additional authentication factor is needed. The access gateway 120 may deny access to the resource 180*a* based on the second decision result. In addition, the access gateway 120 may send (or cause to be sent) a request for the additional authentication factor. In some cases, the user computing device 110*a* may respond by providing an additional access request that includes the additional authentication factor. In some implementations, the described techniques may be repeated until the policy system 140 determines that the stored authentication data 125 includes enough authentication factors received from the user computing devices 110, and the level of authentication indicated by the policy 145*a* is met. In some cases, each of the user computing devices 110 is allowed (or denied) access to a requested resource, based on a determination that the level of authentication for the requested resource is met (or not met).

Figure 2A:
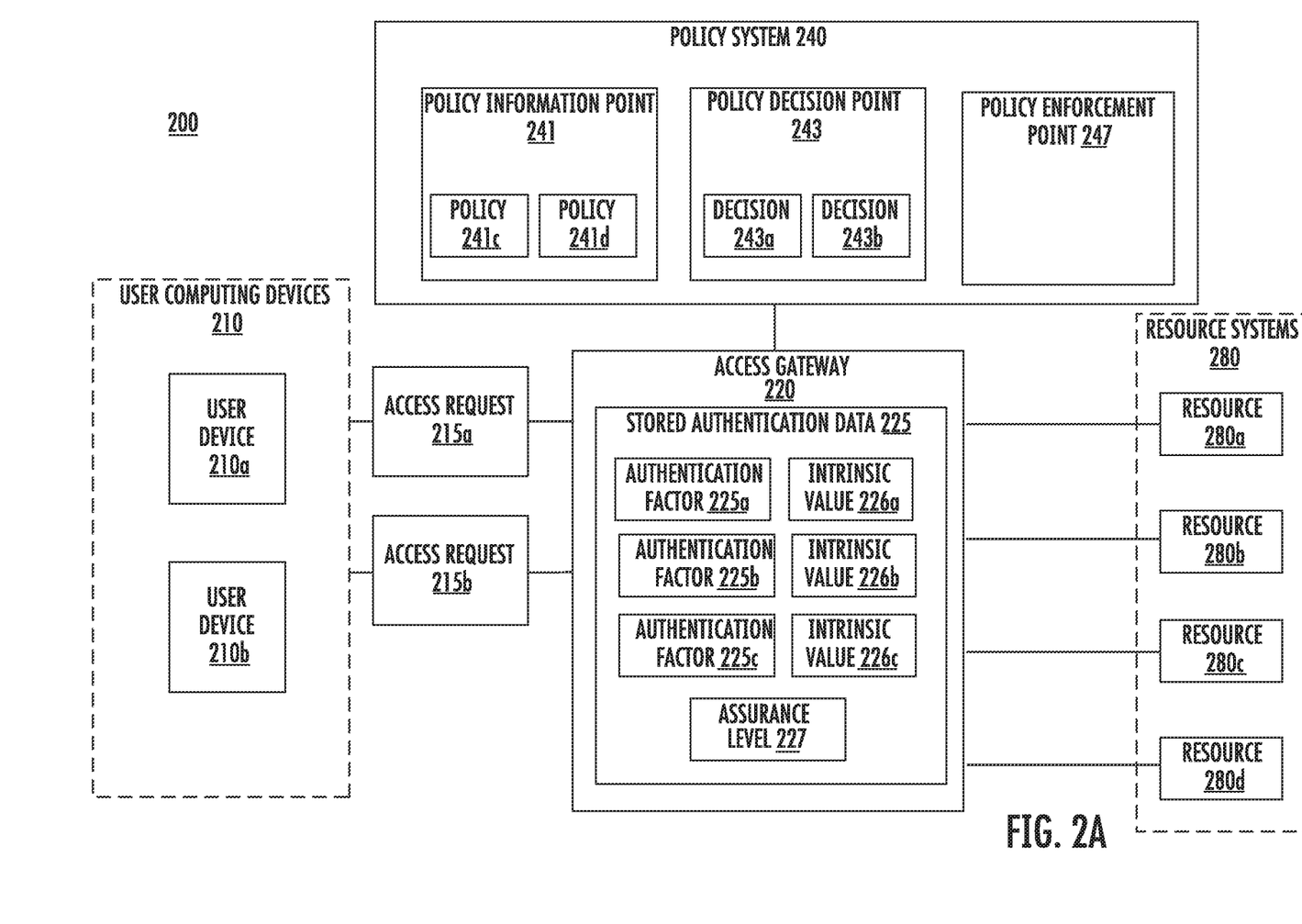
FIGS. 2a and 2b are block diagrams depicting examples of a multi-resource computing environment including an access gateway and a policy system, according to certain implementations.

FIG. 2*a* is a block diagram depicting an example of a multi-resource computing environment 200. The multi-resource environment 200 may include an access gateway 220 and a policy system 240. In addition, the multi-resource environment 200 may include (or communicate with) multiple computing devices, such as the user devices 210*a* or 210*b* (collectively referred to herein as user computing devices 210). The user devices 210 may be associated with a particular user of the environment 200, such that the user accesses (or requests access to) computing resource systems in the environment 200, such as the computing resource systems 280*a*, 280*b*, 280*c*, and 280*d* (collectively referred to herein as resource systems 280), via the user computing devices 210.

In some implementations, the access gateway 220 may control access of the user computing devices 210 to computing resource systems in the environment 200, including the resource systems 280. In addition, the access gateway 220 may include stored authentication data 225, including multiple authentication factors received from the user computing devices 210. The multiple authentication factors may be received from various devices of the user computing devices 210. In addition, the multiple authentication factors may be associated with multiple requests to access various systems of the resource systems 280. The multiple access requests may be received at various times. For example, in the multi-resource environment 200, the stored authentication data 225 may include authentication factors 225*a*, 225*b*, and 225*c*. The authentication factors 225*a*, 225*b*, and 225*c* may be associated with previous access requests (e.g., received at an earlier time) from the user computing devices 210. For example, the authentication factor 225*a* may have been received from user device 210*a*, and may be associated with a request to access resource system 280*a*. In addition, the authentication factors 225*b* and 225*c* may have been received from user device 210*b*, and may be associated with a request to access resource system 280*b*. In some cases, an authentication factor may be stored until a criteria is satisfied, and deleted (or otherwise invalidated) after satisfaction of the criteria. For example, an authentication factor may be associated with a time duration, such that the authentication factor is deleted upon completion of the time duration.

The stored authentication data 225 may include additional data associated with the authentication factors received from the user computing devices 210. In some cases, the access gateway 220 generates data describing the authentication factors. For example, the access gateway 220 determines, for each of the authentication factors 225*a*-225*c*, a respective intrinsic value 226*a*, 226*b*, and 226*c*. The intrinsic value 226*a* may indicate a level of validity, determined by the access gateway 220, associated with the authentication factor 225*a*. In addition, the intrinsic values 226*b* and 226*c* may each indicate a level of determined validity associated respectively with the authentication factors 225*b* and 225*c*. As an example, and not by way of limitation, intrinsic values may include one or more data types, such as a Boolean value, an integer value, a text value, other suitable data types, or any combination of these. The intrinsic values 226*a*-226*c* may be determined based on data indicating a relative validity of the associated authentication factors. In some cases, the validity data may include an indication of a relative strength of an authentication factor. For example, an email address may be indicated as having a relatively low strength, biometric data as having a medium strength, and a multi-factor authentication (e.g., a password-protected login combined with a one-time token) as having a relatively high strength. In addition, the validity data may include an indication of time, such as an authentication factor received several hours ago, or an authentication factor received two months ago. Furthermore, the validity data may include an indication of trust. For example, a login received from a user device that has been previously used to request access may receive a higher trust value than the same login received from a user device that is being used for the first time to request access. The validity data may include (or be based on) additional information, such as a device identification, a geographical location, a time of day of an access request, or any other suitable information.

In some implementations, the access gateway 220 may generate data describing a combination of the authentication factors. For example, the access gateway 220 may determine, based on a combination of the intrinsic values 226*a*-226*c*, an assurance level 227. The assurance level 227 may indicate a cumulative validity of the group of authentication factors 225*a*-225*c*. In some cases, the assurance level 227 is associated with the particular user of the user computing devices 210. For example, the assurance level 227 may indicate a cumulative authentication assurance level that the user has provided, based on the combination of access requests and authentication factors received from that user, via all of the user's devices 210. By example, and not by way of limitation, combinations of intrinsic values may include mathematical combinations (e.g., sums, multiplication products), logical combinations (e.g., an IP address indicating a workplace logically combined with a login timestamp indicating normal business hours), concatenation (e.g., a series of successful login requests), or any other suitable combination. In some cases, the assurance level 227 is determined based on a portion of an intrinsic value. For example (and not by limitation), if the authentication factor 225*a* includes login data and an IP address, the assurance level 227 could be determined based on the intrinsic value of the login data, without being based on the intrinsic value of the IP address.

In the multi-resource computing environment 200, the access gateway 220 may receive a request to access an additional one of the computing resources 280. For example, the authentication factors 225*a*-225*c* may be associated with previous requests from the user computing devices 210 to access resource systems 280*a* and 280*b*. The access gateway 220 may receive, from user device 210*a*, an additional access request 215*a* to access the resource system 280*c*. In some cases, the access gateway 220 may provide the access request 215*a* (or an indication of the request 215*a*) to the policy system 240. In addition, the access gateway 220 may provide to the policy system 240 some or all of the stored authentication data 225, such as the assurance level 227.

In some implementations, the policy system 240 may include one or more additional systems, such as a policy information point 241, a policy decision point 243, or a policy enforcement point 247. The policy system 240 (or a component thereof) may receive the access request 215*a* and the assurance level 227. In some implementations, the policy system 240 receives an access request from a user computing device, and requests an associated assurance level from the access gateway 220.

In the environment 200, the policy decision point 243 may receive the access request 215*a*, or information describing the request, from one or more of the access gateway 220 or the policy enforcement point 247. Responsive to receiving the access request 215*a*, the policy decision point 243 may request information, such as from one or more of the access gateway 220 or the policy information point 241. The requested information may include data related to one or more of the assurance level 227, the access request 215*a*, or a policy 241*c* associated with the requested resource system 280*c*. For example, based on information included in the access request 215*a*, the policy decision point 243 may request, from the access gateway 220, information related to the assurance level 227, such as an IP address of the user device 210*a* or a history of previous access requests. In addition, the policy decision point 243 may request, from the policy information point 241, information included in (or associated with) the policy 241c, such as a threshold level of authentication, or a risk tolerance.

A policy decision point may determine a result of a comparison between a policy and an assurance level. In the environment 200, the policy decision point 243 may receive one or more of the assurance level 227, the policy 241c, or additional information (e.g., additional information retrieved by the policy information point 241). In addition, the policy decision point 243 may determine whether the combination of the authentication factors 225a-225c, as indicated by the assurance level 227, meets or exceeds the threshold level of authentication required by the policy 241c. In addition, the policy decision point 243 may determine whether the combined validity of the authentication factors 225a-225c, as indicated by the assurance level 227, is within the risk tolerance required by the policy 241c. In the environment 200, the policy decision point 243 may generate a decision 243a indicating that the assurance level 227 satisfies the policy 241c. Based on the decision 243a (or an indication thereof received from the policy system 240), the access gateway 220 may allow the user device 210a to access the resource system 280c.

In some implementations, an access gateway (or a policy system) may request additional authentication information in response to an access request. For example, the access gateway 220 may receive, from user device 210b, another access request 215b to access the additional resource system 280d. In some cases, the access gateway 220 may provide the access request 215b and/or the assurance level 227 to the policy system 240, such as to the policy decision point 243. In addition, the policy decision point 243 may perform an additional comparison between the assurance level 227 and an additional policy 241d associated with the requested resource system 280d. For example, the policy decision point 243 may determine that the combination of the authentication factors 225a-225c is below an additional threshold authentication level required by the policy 241d. In some cases, the policy decision point 243 may also determine whether the combined validity of the authentication factors 225a-225c is within a risk tolerance required by the policy 241d. The additional comparison may indicate that the assurance level 227 is below the threshold authentication level, or outside of a risk tolerance, for the resource system 280d. In response to receiving the result for resource system 280d, the policy decision point 243 may generate a decision 243b indicating that the assurance level 227 does not satisfy the policy 241d.

In some implementations, the policy enforcement point 247 may receive the decision 243b. In addition, the policy enforcement point 247 may determine, based on the decision 243b, that one or more additional authentication factors could satisfy the policy 241d. In some cases, the policy enforcement point 247 may modify the decision 243b to indicate the additional authentication factors. In the environment 200, the access gateway 220 may receive the modified decision 243b from the policy system 240. Based on the modified decision 243b, the access gateway 220 may deny access to the resource system 280d to the user device 210b. In addition, the access gateway 220 may provide a request, to the user device 210b, for the additional authentication factors. For example, the request for the additional factors may be provided as an alert message, which may be displayed on an output device associated with the user device 210b. The alert message may or may not indicate that access to the resource system 280d was denied (e.g., before the alert was received). In some cases, the access gateway 220 may deny access to the user device 210b without requesting additional authentication factors. For example (and not by way of limitation), an experienced user of the multi-resource environment 200 may realize that additional authentication data is expected, and provide an additional authentication factor.

In some cases, the access gateway 220 may receive the additional authentication factors from other computing systems in the multi-resource computing environment 200. For example, based on the modified decision 243b, the access gateway 220 may request additional information from one or more of the resource systems 280, such as additional information describing previous access requests or interactions. For example, the resource systems 280a or 280b may provide data describing previous interactions related to the user device 210a or the access request 215a, such as a username/password combination, a GPS coordinate, session information (e.g., actions performed during a session associated with the user device request), or other previous interactions.

Figure 2B:
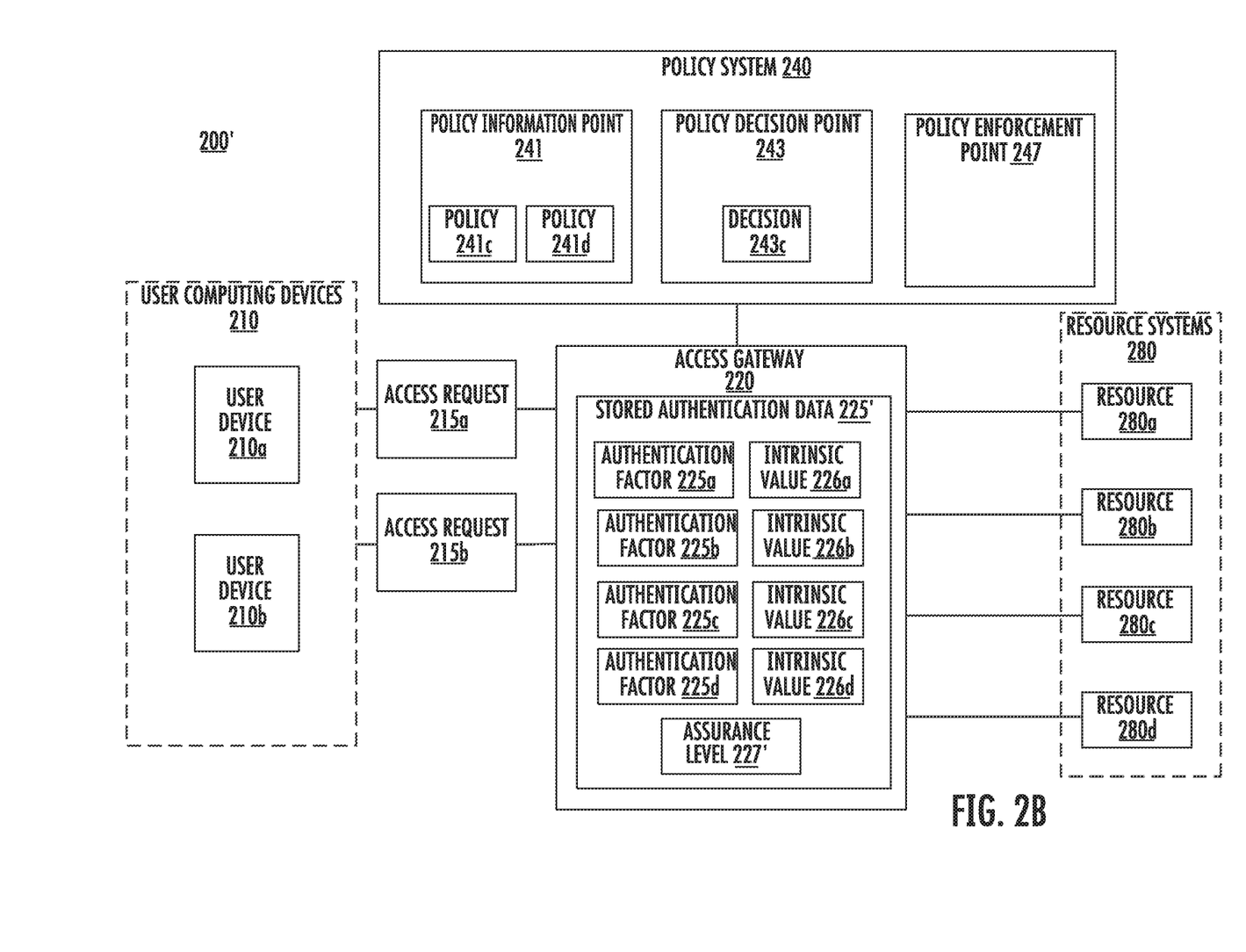

FIG. 2b is a block diagram depicting an example of a modified multi-resource computing environment 200', in which modifications or additional operations may be made by components described in regards to FIG. 2a. In the multi-resource environment 200', the access gateway 220 may receive from the user device 210b, or from one of the resource systems 280, or both, one or more of the requested additional authentication factors, such as authentication factor 225d. In addition, based on the additional authentication factor 225d, the access gateway 220 may modify the stored authentication data 225 to generate modified stored authentication data 225'. The access gateway 220 may also modify the assurance level 227 to generate the modified assurance level 227', based on the additional authentication factor 225d. In addition, the access gateway 220 may modify the assurance level 227 to reflect the combination of the intrinsic values, or the cumulative validity, or both, of the group of authentication factors 225a, 225b, 225c, and 225d. For example, the access gateway 220 may determine an intrinsic value 226d associated with the authentication factor 225d. The intrinsic value 226d may be included in the modified authentication data 225', and the modified assurance level 227' may be based on the combination of the intrinsic values 226a, 226b, 226c, and 226d.

The access gateway 220 may provide the access request 215b and the modified assurance level 227' to the policy system 240. Based on a comparison of the modified assurance level 227' with the policy 241d, the policy system 240 (including one or more of the policy information point 241, the policy decision point 243, and the policy enforcement point 247, as described in regards to FIG. 2a) may determine whether the modified assurance level 227' satisfies the policy 241d. For example, the policy decision point 243 may determine that the modified assurance level 227' meets or exceeds the threshold level of authentication associated with the resource system 280d. In addition, the policy decision point 243 may determine that the modified assurance level 227' is within a risk tolerance associated with the resource system 280d. In the modified environment 200', the policy decision point 243 may generate an additional decision 243c indicating that the modified assurance level 227' satisfies the policy 241d. Based on the decision 243c (or an indication thereof received from the policy system 240), the access gateway 220 may allow the user device 210b to access the resource system 280d. In addition, the access gateway 220 may receive another access request from an additional user device associated with the particular user (such as from user device 210*a*) to access the resource system 280*d*. The access gateway 220 may receive an additional decision indicating that the policy 241*d* is satisfied, and allow the additional user device to access the resource system 280*d*.

Figure 3:
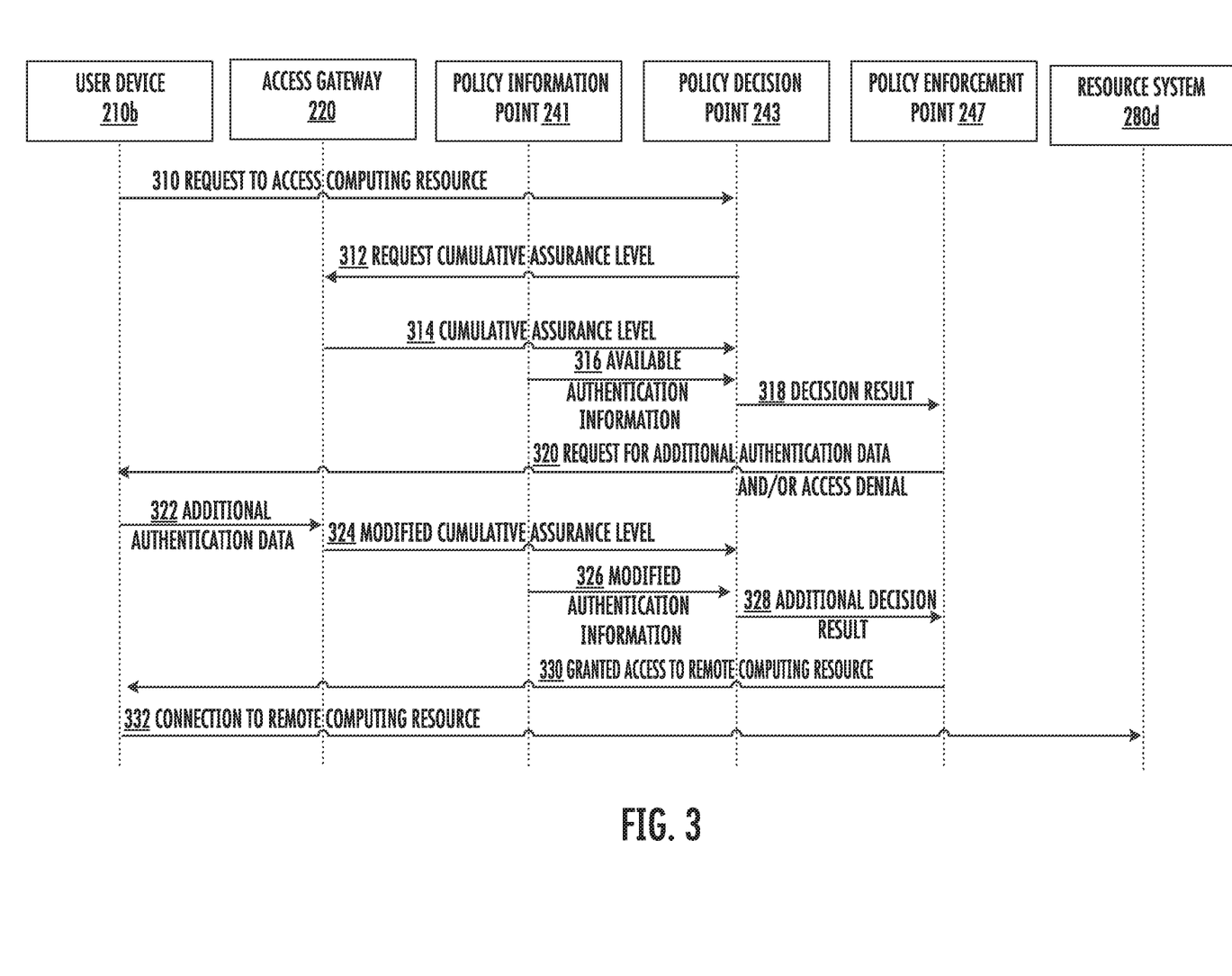
FIG. 3 is a diagram depicting an example of a data flow for an access gateway, according to certain implementations.

FIG. 3 depicts an example of a data flow for an access gateway, according to some implementations. For convenience, and not by way of limitation, FIG. 3 is described with reference to FIGS. 2*a* and 2*b*. Other implementations, however, are possible.

At step 310, a user device, such as user device 210*b*, requests access to a computing resource system, such as the resource system 280*d*, in a multi-resource computing environment. For example, the user device provides an access request, such as the access request 215*b*. In some implementations, the access request is associated with a particular user of the multi-resource computing environment, or with multiple user devices with which the particular user accesses the environment. In FIG. 3, the access request is received by a policy decision point, such as the policy decision point 243. In some cases, another component in the multi-resource computing environment, such as the access gateway 220 or the policy enforcement point 247, receives the access request and provides the access request to the policy decision point. In addition, the policy decision point may receive the access request from the user device, such as via one or more networks on which the user device and the policy decision point communicate. In some implementations, the access request may include some authentication data, such as an authentication factor received from the user device. The authentication data may be received by the policy decision point, the access gateway, or both.

At step 312, the policy decision point 243 requests, from the access gateway 220, a cumulative assurance level that is associated with the user device 210*b* (or the particular user of the user device 210*b* ), such as the assurance level 227. The cumulative assurance level may be based on authentication data, such as the stored authentication data 225, or one or more authentication factors, such as the authentication factors 225*a*-225*c*. The cumulative assurance value may be based on a combination of authentication data received from multiple user devices associated with the particular user. In addition, the combined authentication data may be associated with multiple requests to access one or more resources systems in the multi-resource computing environment. In some cases, the cumulative assurance level is based on one or more intrinsic values of the authentication factors, such as the intrinsic values 226*a*-226*c*. In addition, the intrinsic values 226*a*-226*c* may indicate a validity level or an authentication level, or both, of the associated authentication factors 225*a*-225*c* . For example, and not by way of limitation, an authentication factor 225*a*-225*c* including a login/password combination may have a Boolean intrinsic value 226*a*-226*c* indicating whether the login/password combination is correct, while another authentication factor 225*a*-225*c* including biometric data may have one or more integer intrinsic values indicating a confidence interval (or range of intervals) in the validity of the biometric data.

At step 314, the access gateway 220 provides the cumulative assurance level to the policy decision point 243. In some implementations, the policy decision point 243 may receive additional information related to the policy or the access request. For example, at step 316, the policy decision point 243 receives additional information from a policy information point, such as from a policy information point 241. The policy decision point 243 may receive a policy associated with the requested resource system 280*d*, such as the policy 241*d*. In addition, the policy decision point 243 may receive additional information describing (without limitation) the access request (e.g., a relative password strength), the user device 210*b* that submitted the access request (e.g., an IP address), previous actions by the user associated with the access request (e.g., a session history), or other suitable information.

The policy decision point 243 may receive, from the access gateway 220 or policy information point 241, one or more of the cumulative assurance level, the policy, and the additional information. In some cases, the policy decision point 243 may determine a risk associated with the access request, based on the cumulative assurance level and/or the additional information. A risk score of the access request may indicate a likelihood that the access request is a fraudulent request (e.g., a request based on false information). For example, an access request received from a user device that has been previously used by the particular user, with a recognized IP address, may receive a relatively low risk score. In addition, another access request received from a user device not previously used, with an IP address that is not recognized, may receive a relatively high risk score. In some cases, the risk score for the access request is based on a combination of multiple risk scores for multiple authentication factors associated with the access request. For example, an access request that is associated with a known username/password having a low risk score and an unknown IP address having a high risk score may receive a medium risk score (e.g., based on the combination of the low risk score and the high risk score).

In some cases, the policy decision point 243 accesses information indicating an authorization of the particular user to access the resource system 280*d*. For example, the policy decision point 243 may receive permissions information for the requested resource system 280*d*. The permissions information may indicate that the requested computing system is available to authenticated users having a particular level of permissions (e.g., network administrator, premium subscriber, super-user). In addition, the permissions information may indicate that authenticated users who do not meet (or exceed) the required level of permissions are not authorized to access the resource system 280*d*.

The policy decision point may compare the cumulative assurance level to a policy associated with the requested resource system. For example, the policy decision point 243 may compare the assurance level 227 with the policy 241*d* for the resource system 280*d*. In some implementations, the policy decision point 243 may generate a decision, such as the decisions 243*a*-243*c*, based on the comparison of the cumulative assurance level with the policy. For example, the policy decision point 243 may determine whether the cumulative assurance level satisfies the policy, such as by satisfying a threshold authentication level or being within a risk tolerance. In addition, the policy decision point 243 may generate (or modify) the decision based on additional information or a risk score. In some implementations, the policy decision point 243 generates multiple decision results. For example, the policy decision point 243 may generate a first decision indicating that the particular user associated with the cumulative assurance level is authenticated in the multi-resource computing environment. In addition, the policy decision point 243 may generate a second decision indicating that the particular user is not authorized to access the requested resource system 280*d*. For example, the particular user may be recognized (based on the cumulative assurance level) as a legitimate user of the multi-resource system 280*d*, but may have insufficient permissions to access the requested resource system 280d.

At step 318, the policy decision point 243 provides the decision result, and any additional results (e.g., a risk analysis), to a policy enforcement point, such as the policy enforcement point 247. The policy enforcement point 247 may generate an indication that the access request is denied, based on the decision. In some cases, the policy enforcement point 247 may determine whether additional authentication data is needed to satisfy the policy for the requested resource system 280d. For example, and not by way of limitation, the policy enforcement point 247 may determine that multifactor authentication data could modify the cumulative assurance level to a level that satisfies the policy.

At step 320, the policy enforcement point 247 provides a request for the additional authentication data, or the indication that the access request is denied, or both. In FIG. 3, the denial and the authentication data request are received by the user device 210b. In some cases, the access gateway 220 receives one or both of the denial or the authentication data request. In addition, the access gateway 220 may provide the denial or the authentication data request to the user device 210b. In some implementations, the access gateway 220 prevents the user device from accessing the requested resource system 280d, based on the denial.

At step 322, the user device provides additional authentication data, such as the authentication factor 225d, to the access gateway 220. In some aspects, the additional authentication data is provided by other components in the multi-resource computing environment, such as other resource systems. In FIG. 3, the additional authentication data is received by the access gateway 220. In some cases, the additional authentication data is received by the policy enforcement point 241. The policy enforcement point 241 may provide the additional authentication data to the access gateway 220. In some implementations, the additional authentication data includes data indicating an authorization to access the resource system, such as a permission associated with an authenticated user (e.g., administrative permissions). The access gateway 220 may modify the cumulative assurance level based on the additional authentication data. For example, access gateway 220 may generate the modified assurance level 227' based on the intrinsic values associated with the authentication factors 225a-225d.

In step 324, the access gateway 220 provides the modified cumulative assurance level to the policy decision point 243. The policy decision point 243 may compare the modified cumulative assurance level to the policy associated with the requested resource system 280d. In some cases, the policy decision point 243 may access additional information related to the policy or the access request, such as authorization information for the particular user. For example, at step 326, the policy information point 241 provides additional information associated with the additional authentication data. The policy decision point 243 may determine a modified risk associated with the access request, based on the modified assurance level and/or the additional information.

In some implementations, the policy decision point 243 may generate one or more additional decisions based on the received information. For example, the policy decision point 243 may determine that the modified assurance level satisfies the policy for the requested resource system 280d. In addition, the policy decision point 243 may determine whether the particular user associated with the modified assurance level is authorized to access the requested resource system 280d.

At step 328, the policy decision point 243 provides the additional decision result to the policy enforcement point 247. The policy enforcement point 247 may generate an indication that the access request is granted, based on the additional decision. At step 330, the policy enforcement point 247 provides the grant indication. In FIG. 3, the indication of granted access is received by the user device 210b. In addition, the access gateway 220 receives the indication. The access gateway 220 may provide the grant indication to the user device 210b. In some implementations, the access gateway 220 allows the user device 210b to access the requested resource system 280d, based on the grant indication.

At step 332, the user device 210b accesses the resource system 280d. In some cases, the user device 210b may establish a connection to the resource system 280d via one or more networks. In addition, the connection between the user device 210b and the resource system 280d may be established via the access gateway 220. For example, the access gateway 220 may provide a communication channel (e.g., a virtual private network, a network tunnel) by which data may be exchanged between the user device 210b and the resource system 280d. In addition, the access gateway 220 may provide to the resource system information associated with the user device 210b (e.g., a login/password combination, an IP address), and receive from the resource system 280d information related to a communication channel (e.g., a session ID). The access gateway 220 may provide the communication channel information to the user device 210b, such that the user device 210b and the resource system 280d may establish a connection based on the information.

Figure 4:
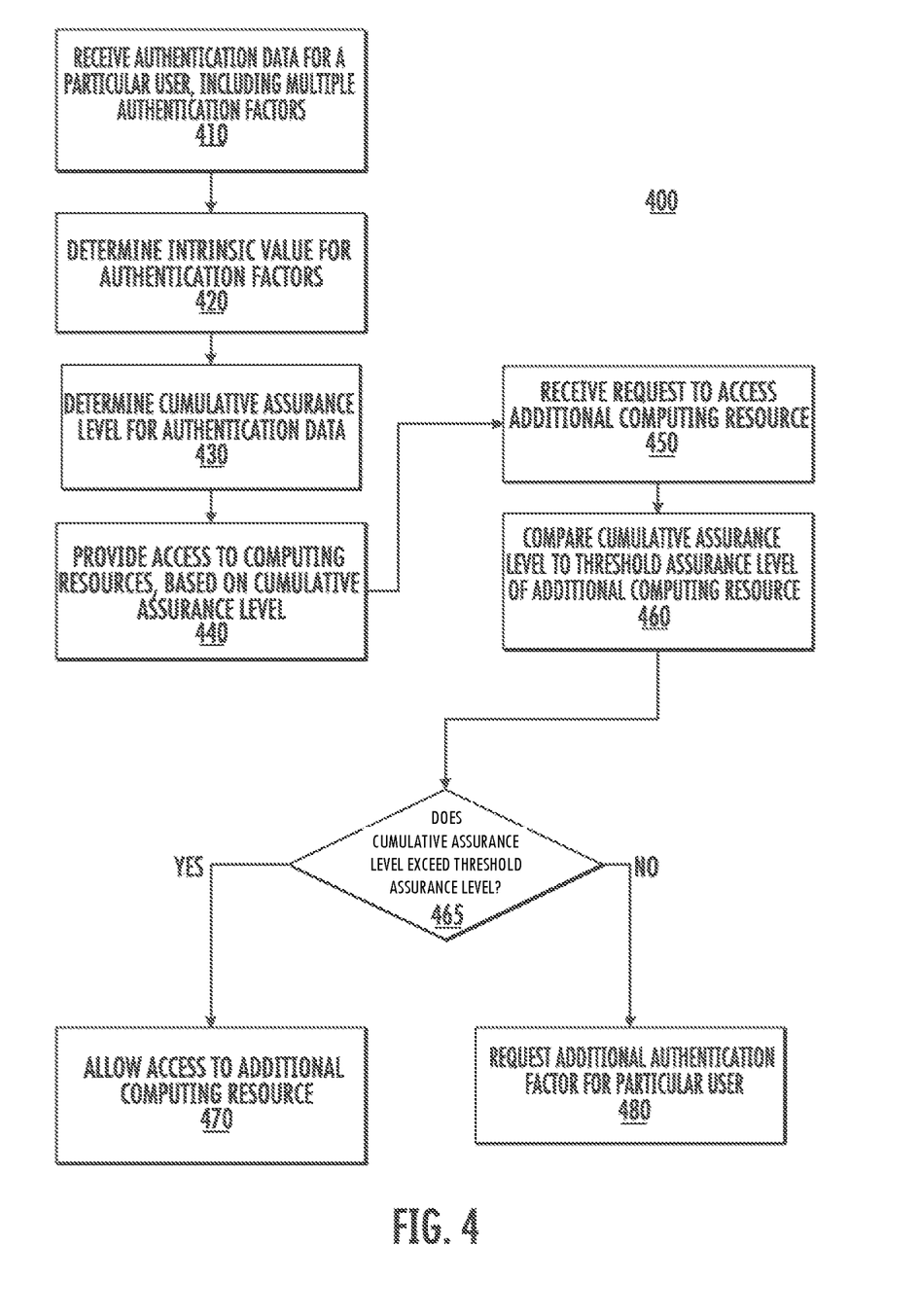
FIG. 4 is a flow chart depicting an example of a process for authenticating an access request for a computer resource system in a multi-resource computing environment, according to certain implementations.

FIG. 4 is a flow chart depicting an example of a process 400 for authenticating an access request for a computing resource system in the multi-resource computing environment. In some implementations, such as described in regards to FIGS. 1-3, a computing device executing an access gateway, a policy system, or both, implements operations described in FIG. 4, by executing suitable program code. For illustrative purposes, the process 400 is described with reference to the examples depicted in FIGS. 1-3. Other implementations, however, are possible.

At block 410, the process 400 involves receiving authentication data that includes multiple authentication factors. The authentication data may be associated with a particular user of the multi-resource computing environment. In addition, the authentication data may include authentication factors that are associated with multiple access requests, such as previous requests to access multiple resource systems in the multi-resource environment. The authentication data may be received from more than one user computing device associated with the particular user. For example, a first one of the multiple authentication factors may be associated with a first access request for a first one of the resource systems, and may be received from a first user device. In addition, a second one of the multiple authentication factors may be associated with a second access request for a second resource system, and may be received from a second user device. In some cases, the authentication data is received over a period of time. For example, the multiple authentication factors may be associated with requests that are provided over a time span of several hours, weeks, or months.

At block 420, the process 400 involves determining an intrinsic value for each of the authentication factors included in the authentication data. Each intrinsic value may indicate, for the respective associated authentication factor, a validity level of the factor. In addition, each intrinsic value may indicate a strength of the authentication factor, a time frame of the factor, a trust value of the factor, or other characteristics indicating a level of validity for the associated authentication factor. The intrinsic value may be based on a combination of the characteristics indicating the validity level for the factor.

At block 430, the process 400 involves determining a cumulative assurance level for the authentication data. In some cases, the cumulative assurance level is based on a combination of the intrinsic values for each of the multiple authentication factors included in the authentication data. For example, the cumulative assurance level may indicate a combined level of validity for the group of multiple authentication factors.

At block 440, the process 400 involves providing access to the multiple computing resource systems corresponding to the authentication data. For example, each of the user computing devices that provided one of the multiple access requests may be allowed to access the requested resource system (or systems), based on the cumulative assurance level of the authentication data.

At block 450, the process 400 involves receiving an additional access request to access an additional computing resource system in the multi-resource environment. The additional request may be received from one of the user computing devices associated with the particular user. In addition, the requested additional resource system may be associated with a threshold level of authentication. In some cases, the additional access request is for an additional resource system that is different from the previously accessed resource systems described in relation to block 440. In addition, the additional access request is for a particular function or component of a previously accessed resource system, such that the particular function or component requires a level of authentication that is different from the authentication level associated with the previously accessed resource system.

At block 460, the process 400 involves comparing the cumulative assurance level to the threshold authentication level associated with the additional resource system. For example, one or more of an access gateway or a policy system may compare the cumulative assurance level to a level of authentication indicated by a policy that is associated with the additional resource system. In some cases, one or more additional comparisons are performed based on values that are associated with the additional resource system. For example, a risk score associated with the access request may be compared to a risk tolerance indicated by the policy. If the policy indicates a risk tolerance of 25% (e.g., on a hypothetical scale from 0% risk to 100% risk), the requesting user device may be denied access if it has a risk score above 25% (e.g., riskier than the indicated tolerance).

At block 465, the process 400 involves determining whether the cumulative assurance level meets or exceeds the threshold authentication level. In some cases, operations related to block 465 include determining whether the cumulative assurance level is within the risk tolerance. If operations related to block 465 determine that the cumulative assurance level meets or exceeds the threshold authentication level (or that the risk score is within the risk tolerance), the process 400 proceeds to another block, such as block 470. If operations related to block 465 determine that the cumulative assurance level is below the threshold authentication level (or that the risk score is outside of the risk tolerance), the process 400 proceeds to another block, such as block 480.

At block 470, the process 400 involves allowing access to the additional computing resource system. For example, the access gateway may allow the user computing device to access the requested additional resource system. In some cases, multiple user computing devices that are associated with the device from which the additional authentication request was received (e.g., multiple user devices associated with the particular user) are allowed to access the additional resource system.

At block 480, process 400 involves requesting one or more additional authentication factors. For example, a request for an additional authentication factor may be provided to the user computing device from which the additional authentication request was received. In addition, the access gateway may deny an access request for an additional resource system.

In some implementations, operations related to one or more of the blocks 450, 460, 465, or 480 may be repeated. For example, responsive to receiving an additional authentication factor from the user computing device, the access gateway may modify the cumulative assurance level, and perform an additional comparison of the modified assurance level to the threshold authentication level. If the modified assurance level meets or exceeds the threshold authentication level, process 400 may proceed to block 470, and the user computing device may be permitted access to the additional resource system.

If the modified assurance level does not meet or exceed the threshold authentication level, the access gateway may request one or more further additional authentication factors from the user computing device. In some cases, the access gateway may request the additional authentication factors until the threshold authentication level is met. In addition, the access gateway may perform other operations in response to insufficient authentication data. For example, responsive to receiving multiple authentication requests that fail to meet the threshold authentication level, the access gateway may block the user computing device from accessing the requested additional resource system and any other previously accessed resource systems in the multi-resource environment. In some cases, the threshold authentication level may be adjusted in response to multiple failed authentication requests, such as by increasing the threshold level to require a more stringent level of authentication.

Figure 5:
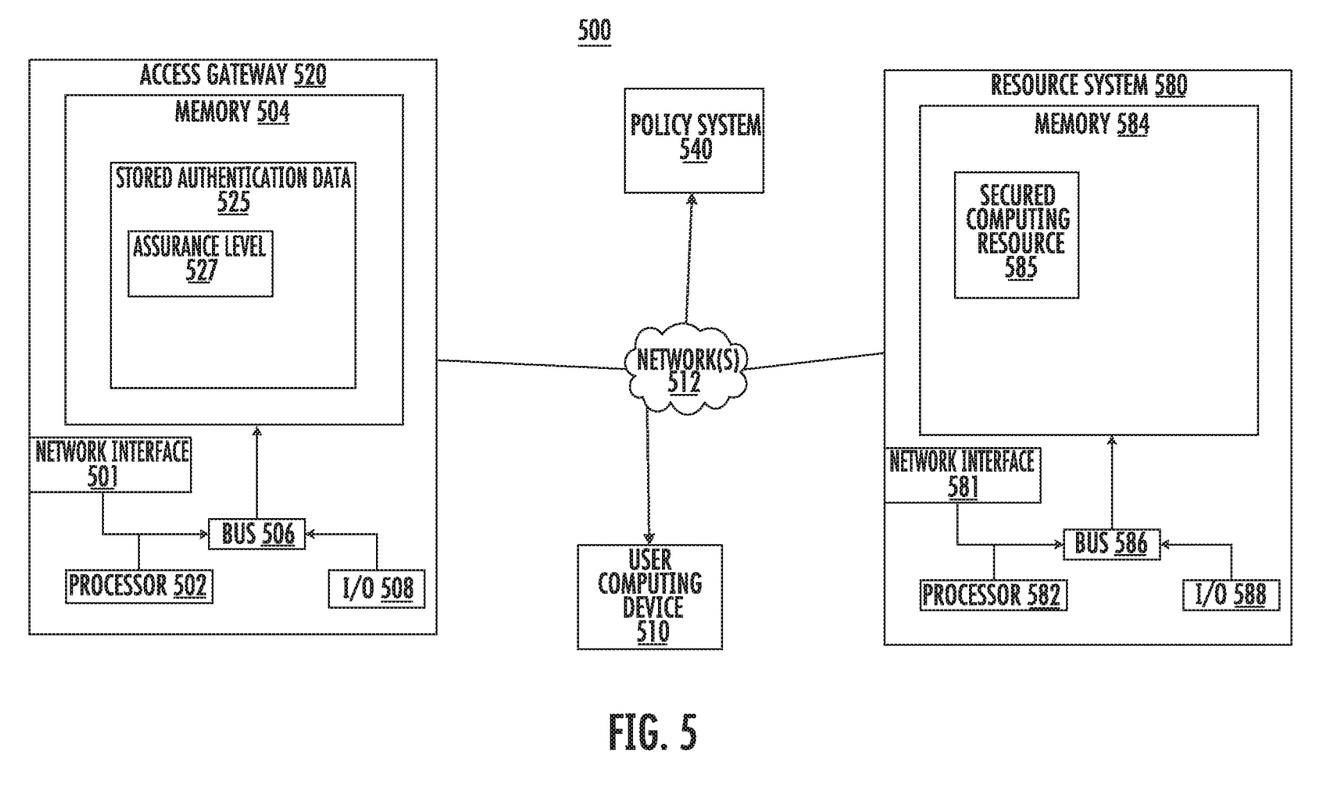
FIG. 5 is a block diagram depicting an example of a computing system for implementing an access gateway in a multi-resource computing environment, according to certain implementations.

Any suitable computing system or group of computing systems can be used for performing the operations described herein. For example, FIG. 5 is a block diagram depicting a multi-resource computing environment 500, according to certain implementations.

The depicted example of an access gateway 520 includes one or more processors 502 communicatively coupled to one or more memory devices 504. The processor 502 executes computer-executable program code or accesses information stored in the memory device 504. Examples of processor 502 include a microprocessor, an application-specific integrated circuit ("ASIC"), a field-programmable gate array ("FPGA"), or other suitable processing device. The processor 502 can include any number of processing devices, including one.

The memory device 504 includes any suitable non-transitory computer-readable medium for storing a stored authentication data 525, an assurance level 527, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The access gateway 520 may also include a number of external or internal devices such as input or output devices. For example, the access gateway 520 is shown with an input/output ("I/O") interface 508 that can receive input from input devices or provide output to output devices. A bus 506 can also be included in the access gateway 520. The bus 506 can communicatively couple one or more components of the access gateway 520.

The access gateway 520 executes program code that configures the processor 502 to perform one or more of the operations described above with respect to FIGS. 1-4. The program code includes operations related to, for example, one or more of the stored authentication data 525, the assurance level 527, or other suitable applications or memory structures that perform one or more operations described herein. The program code may be resident in the memory device 504 or any suitable computer-readable medium and may be executed by the processor 502 or any other suitable processor. In some implementations, the program code described above, the stored authentication data 525, and the assurance level 527 are stored in the memory device 504, as depicted in FIG. 5. In additional or alternative implementations, one or more of the stored authentication data 525, the assurance level 527, and the program code described above are stored in one or more memory devices accessible via a data network, such as a memory device accessible via a cloud service.

The access gateway 520 depicted in FIG. 5 also includes at least one network interface 501. The network interface 501 includes any device or group of devices suitable for establishing a wired or wireless data connection to one or more data networks 512. Non-limiting examples of the network interface 501 include an Ethernet network adapter, a modem, and/or the like. The access gateway 520 is able to communicate with one or more of a policy system 540, one or more user computing devices (such as user computing device 510), and one or more remote computing resource systems (such as resource system 580) using the network interface 501. The policy system 540 is connected to the access gateway 520 via network 512, and the policy system 540 may perform some of the operations described herein, such as operations related to a policy information point, a policy decision point, or a policy enforcement point. Although FIG. 5 depicts the policy system 540 as connected to access gateway 520 via the networks 512, other implementations are possible, including the policy system 540 running as a program in the memory 504 of access gateway 520.

In the multi-resource computing environment 500, the resource system 580 includes one or more processors 582 communicatively coupled to one or more memory devices 584. The processor 582 executes computer-executable program code or accesses information stored in the memory device 584. Examples of processor 582 include a microprocessor, an application-specific integrated circuit ("ASIC"), a field-programmable gate array ("FPGA"), or other suitable processing device. The processor 582 can include any number of processing devices, including one.

The memory device 584 includes any suitable non-transitory computer-readable medium for storing a secured computing resource 585, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The secured computing resource 585 may include one or more computing resources that are accessible to authenticated and authorized users. For example, and not by way of limitation, the secured computing resource 585 may include a database of sensitive information, a computing process (e.g., set of executable operations) capable of performing changes to billing or payment information, a virtual machine (e.g., virtual computing system) that performs network maintenance operations, or other types of computing resources to which access is controlled or limited. In some cases, the resource system 580 may include multiple secured computing resources (e.g., multiple computing processes, multiple databases, a combination of resource types), each of which may have a particular policy indicating the requirements for authentication or authorization for the respective secured computing resource. The policies for the multiple secured computing resources on resource system 580 may or may not have similar requirements for authentication or authorization.

The resource system 580 may also include a number of external or internal devices such as input or output devices. For example, the resource system 580 is shown with an input/output ("I/O") interface 588 that can receive input from input devices or provide output to output devices. A bus 586 can also be included in the resource system 580. The bus 586 can communicatively couple one or more components of the resource system 580.

The resource system 580 executes program code that configures the processor 582 to perform one or more of the operations described above with respect to FIGS. 1-4. The program code includes operations related to, for example, one or more of the secured computing resource 585 or other suitable applications or memory structures that perform one or more operations described herein. The program code may be resident in the memory device 584 or any suitable computer-readable medium and may be executed by the processor 582 or any other suitable processor. In some implementations, the program code described above, the secured computing resource 585 is stored in the memory device 584, as depicted in FIG. 5. In additional or alternative implementations, one or more of the secured computing resource 585 and the program code described above are stored in one or more memory devices accessible via a data network, such as a memory device accessible via a cloud service.

The resource system 580 depicted in FIG. 5 also includes at least one network interface 581. The network interface 581 includes any device or group of devices suitable for establishing a wired or wireless data connection to one or more data networks 512. Non-limiting examples of the network interface 581 include an Ethernet network adapter, a modem, and/or the like. The resource system 580 is able to communicate with one or more of the policy system 540, the access gateway 520, and one or more user computing devices (such as user computing device 510) using the network interface 581.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific implementations thereof, it will be appreciated that those skilled in the art, upon attaining an understanding of the foregoing, may readily produce alterations to, variations of, and equivalents to such implementations. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method of authenticating an access request for accessing a computing resource system in a multi-resource computing environment, the method comprising:
    storing, by an access gateway, authentication data including a plurality of authentication factors, wherein each authentication factor of the plurality of authentication factors corresponds to a particular user of the multi-resource computing environment, wherein each authentication factor of the plurality of authentication factors is received at a different time over a period of time from a different one of a plurality of computing devices associated with the particular user, and wherein each authentication factor of the plurality of authentication factors is included in a corresponding access request received from a respective one of the plurality of computing devices during the period of time to access a corresponding one of a plurality of computing resource systems in the multi-resource computing environment;
    determining, by the access gateway for each authentication factor of the plurality of authentication factors, a respective intrinsic value, wherein the respective intrinsic value indicates a corresponding level of validity for each authentication factor of the plurality of authentication factors;
    determining, by the access gateway, a cumulative assurance level of the authentication data, wherein the cumulative assurance level is based on a combination of respective intrinsic values associated with the plurality of authentication factors;
    after the period of time, receiving, by the access gateway from a computing device of the plurality of computing devices associated with the particular user, the access request to access the computing resource system of the plurality of computing resource systems in the multi-resource computing environment, the computing resource system associated with a threshold authentication level;
    in response to receiving the access request from the computing device, determining, by the access gateway based on a comparison of the cumulative assurance level of the authentication data with the threshold authentication level of the computing resource system, that the threshold authentication level of the computing resource system exceeds the cumulative assurance level of the authentication data;
    responsive to determining that the threshold authentication level of the computing resource system exceeds the cumulative assurance level of the authentication data, requesting, by the access gateway, an additional authentication factor from the computing device;
    receiving, by the access gateway, the additional authentication factor from the computing device; and
    providing, by the access gateway based at least in part on the additional authentication factor, the computing device that provided the access request as well as each of the plurality of computing devices that provided the corresponding access request received during the period of time with access to the computing resource system.

2. The method of claim 1, further comprising:
    responsive to receiving the additional authentication factor, modifying the cumulative assurance level of the authentication data to create a modified cumulative assurance level of the authentication data; and determining that the modified cumulative assurance level of the authentication data exceeds the threshold authentication level of the computing resource system, based on a comparison of the modified cumulative assurance level of the authentication data to the threshold authentication level of the computing resource system, wherein providing access to the computing resource system is responsive to determining that the modified cumulative assurance level of the authentication data exceeds the threshold authentication level of the computing resource system.

3. The method of claim 1, wherein the threshold authentication level of the computing resource system is indicated by a policy associated with the computing resource system.

4. The method of claim 3, wherein the policy further indicates a permission level associated with the computing resource system, the permission level indicating an authorization requirement for accessing the computing resource system.

5. The method of claim 4, wherein determining that the threshold authentication level of the computing resource system exceeds the cumulative assurance level of the authentication data is further based on a comparison of the permission level to authorization information associated with the access request.

6. The method of claim 1, wherein the comparison of the cumulative assurance level of the authentication data to the threshold authentication level of the computing resource system is performed by a policy decision point.

7. The method of claim 1, wherein a policy decision point determines a risk score associated with the access request, the risk score indicating a likelihood of the access request being a fraudulent request.

8. The method of claim 7, wherein determining that the threshold authentication level of the computing resource system exceeds the cumulative assurance level of the authentication data is further based on a comparison of the risk score to a risk tolerance associated with the computing resource system.

9. An access gateway for authenticating an access request for a computing resource system in a multi-resource computing environment, the access gateway comprising:
a processor; and
a memory storing instructions that, when executed by the processor, cause the processor to perform operations comprising
storing authentication data including a plurality of authentication factors, wherein each authentication factor of the plurality of authentication factors corresponds to a particular user of the multi-resource computing environment, wherein each authentication factor of the plurality of authentication factors is received at a different time over a period of time from a different one of a plurality of computing devices associated with the particular user, and wherein each authentication factor of the plurality of authentication factors is included in a corresponding access request received from a respective one of the plurality of computing devices during the period of time to access a corresponding one of a plurality of computing resource systems in the multi-resource computing environment,
determining, for each authentication factor of the plurality of authentication factors, a respective intrinsic value, wherein the respective intrinsic value indicates a corresponding level of validity for each authentication factor of the plurality of authentication factors,
determining a cumulative assurance level of the authentication data, wherein the cumulative assurance level is based on a combination of respective intrinsic values associated with the plurality of authentication factors,
after the period of time, receiving, from a computing device of the plurality of computing devices associated with the particular user, the access request to access the computing resource system of the plurality of computing resource systems in the multi-resource computing environment, the computing resource system associated with a threshold authentication level,
in response to receiving the access request from the computing device, determining, based on a comparison of the cumulative assurance level of the authentication data with the threshold authentication level of the computing resource system, that the threshold authentication level of the computing resource system exceeds the cumulative assurance level of the authentication data,
responsive to determining that the threshold authentication level of the computing resource system exceeds the cumulative assurance level of the authentication data, requesting an additional authentication factor from the computing device,
receiving the additional authentication factor from the computing device, and
providing, based at least in part on the additional authentication factor, the computing device that provided the access request as well as each of the plurality of computing devices that provided the corresponding access request received during the period of time with access to the computing resource system.

10. The access gateway of claim 9, the operations further comprising:
responsive to receiving the additional authentication factor, modifying the cumulative assurance level of the authentication data to create a modified cumulative assurance level of the authentication data; and
determining that the modified cumulative assurance level of the authentication data exceeds the threshold authentication level of the computing resource system, based on a comparison of the modified cumulative assurance level of the authentication data to the threshold authentication level of the computing resource system, wherein providing access to the computing resource system is responsive determining that the modified cumulative assurance level of the authentication data exceeds the threshold authentication level of the computing resource system.

11. The access gateway of claim 9, wherein the threshold authentication level of the computing resource system is indicated by a policy associated with the computing resource system.

12. The access gateway of claim 11, wherein the policy further indicates a permission level associated with the computing resource system, the permission level indicating an authorization requirement for accessing the computing resource system.

13. The access gateway of claim 12, wherein determining that the threshold authentication level of the computing resource system exceeds the cumulative assurance level of the authentication data is further based on a comparison of the permission level to authorization information associated with the access request.

14. The access gateway of claim 9, wherein the comparison of the cumulative assurance level of the authentication data to the threshold authentication level of the computing resource system is performed by a policy decision point.

15. The access gateway of claim 9, wherein a policy decision point determines a risk score associated with the access request, the risk score indicating a likelihood of the access request being a fraudulent request.

16. The access gateway of claim 15, wherein determining that the threshold authentication level of the computing resource system exceeds the cumulative assurance level of the authentication data is further based on a comparison of the risk score to a risk tolerance associated with the computing resource system.

17. A non-transitory computer-readable medium having instructions stored thereon that, when executed by a processor of an access gateway, cause the access gateway to perform operations comprising:

storing authentication data including a plurality of authentication factors, wherein each authentication factor of the plurality of authentication factors corresponds to a particular user of a multi-resource computing environment, wherein each authentication factor of the plurality of authentication factors is received at a different time over a period of time from a different one of a plurality of computing devices associated with the particular user, and wherein each authentication factor of the plurality of authentication factors is included in a corresponding access request received from a respective one of the plurality of computing devices during the period of time to access a corresponding one of a plurality of computing resource systems in the multi-resource computing environment;

determining, for each authentication factor of the plurality of authentication factors, a respective intrinsic value, wherein the respective intrinsic value indicates a corresponding level of validity for each authentication factor of the plurality of authentication factors;

determining a cumulative assurance level of the authentication data, wherein the cumulative assurance level is based on a combination of respective intrinsic values associated with the plurality of authentication factors;

after the period of time, receiving, from a computing device of the plurality of computing devices, an access request to access a computing resource system of the plurality of computing resource systems in the multi-resource computing environment, the computing resource system associated with a threshold authentication level;

in response to receiving the access request from the computing device, determining, based on a comparison of the cumulative assurance level of the authentication data with the threshold authentication level of the computing resource system, that the threshold authentication level of the computing resource system exceeds the cumulative assurance level of the authentication data;

responsive to determining that the threshold authentication level of the computing resource system exceeds the cumulative assurance level of the authentication data, requesting an additional authentication factor from the computing device;

receiving the additional authentication factor from the computing device; and providing, based at least in part on the additional authentication factor, the computing device that provided the access request as well as each of the plurality of computing devices that provided the corresponding access request received during the period of time with access to the computing resource system.

18. The non-transitory computer-readable medium of claim 17, wherein the operations further comprise:

responsive to receiving the additional authentication factor, modifying the cumulative assurance level of the authentication data to create a modified cumulative assurance level of the authentication data; and determining that the modified cumulative assurance level of the authentication data exceeds the threshold authentication level of the computing resource system, based on a comparison of the modified cumulative assurance level of the authentication data to the threshold authentication level of the computing resource system, wherein providing access to the computing resource system is responsive to determining that the modified cumulative assurance level of the authentication data exceeds the threshold authentication level of the computing resource system.

* * * * *